UNITED STATES PATENT OFFICE.

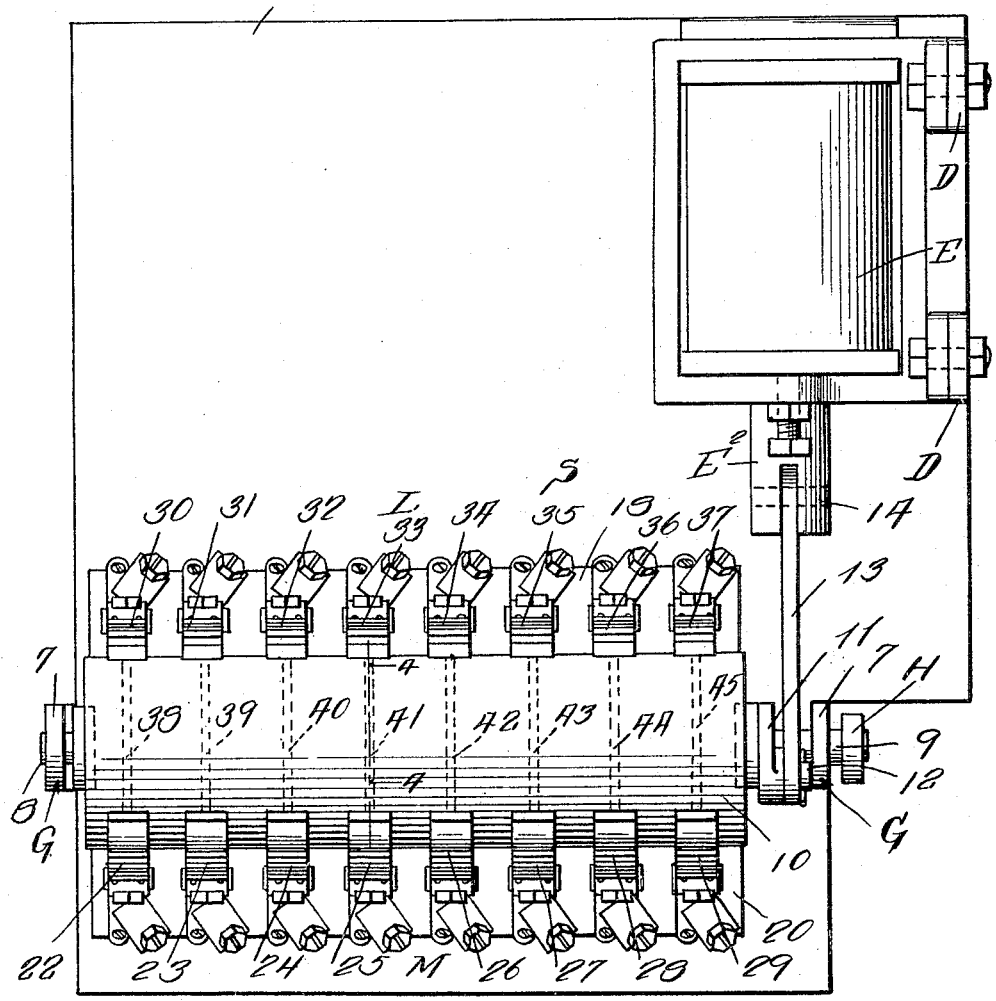
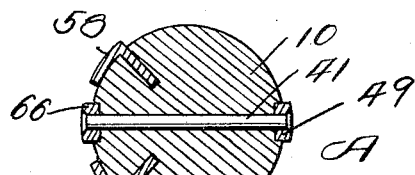

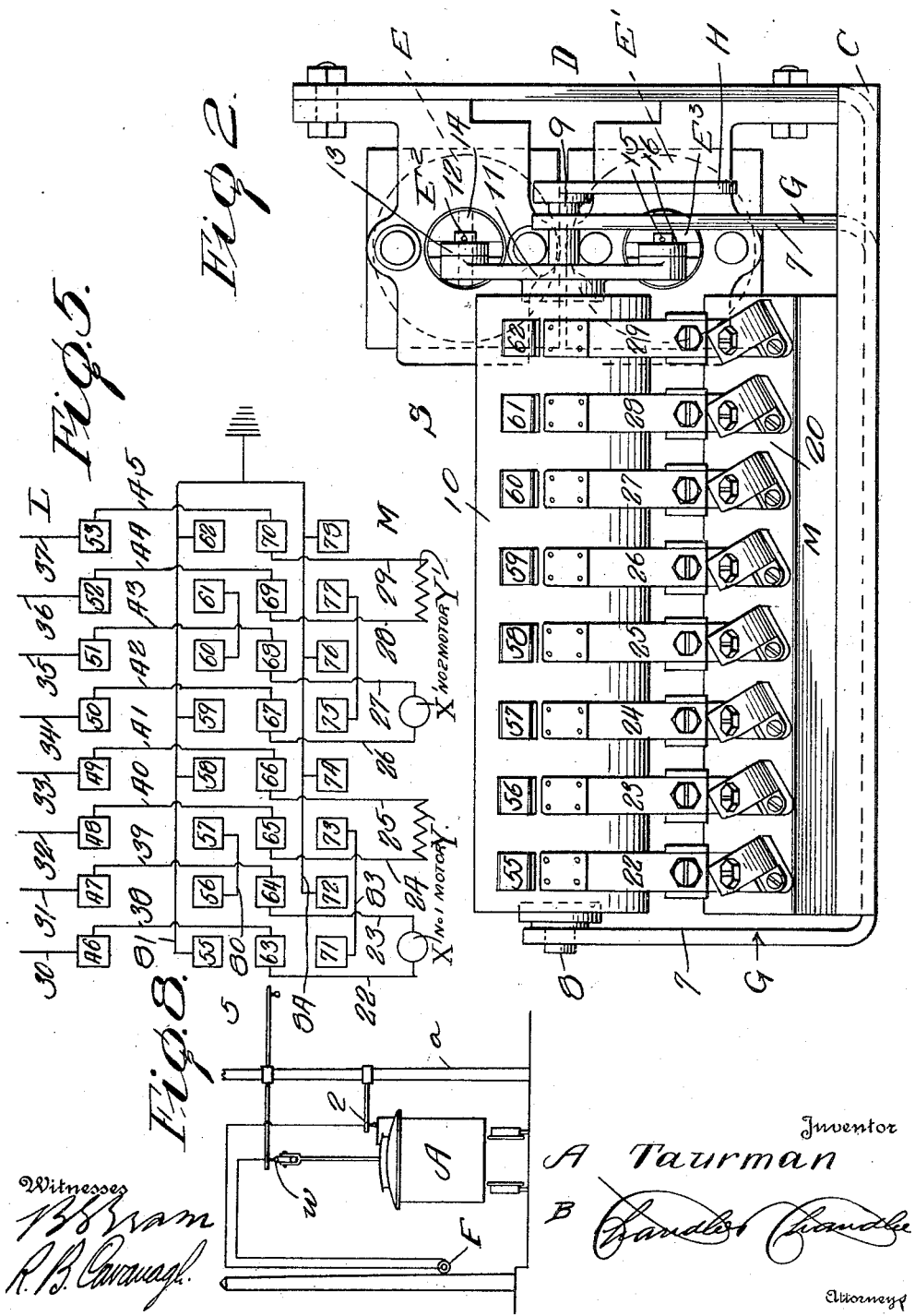

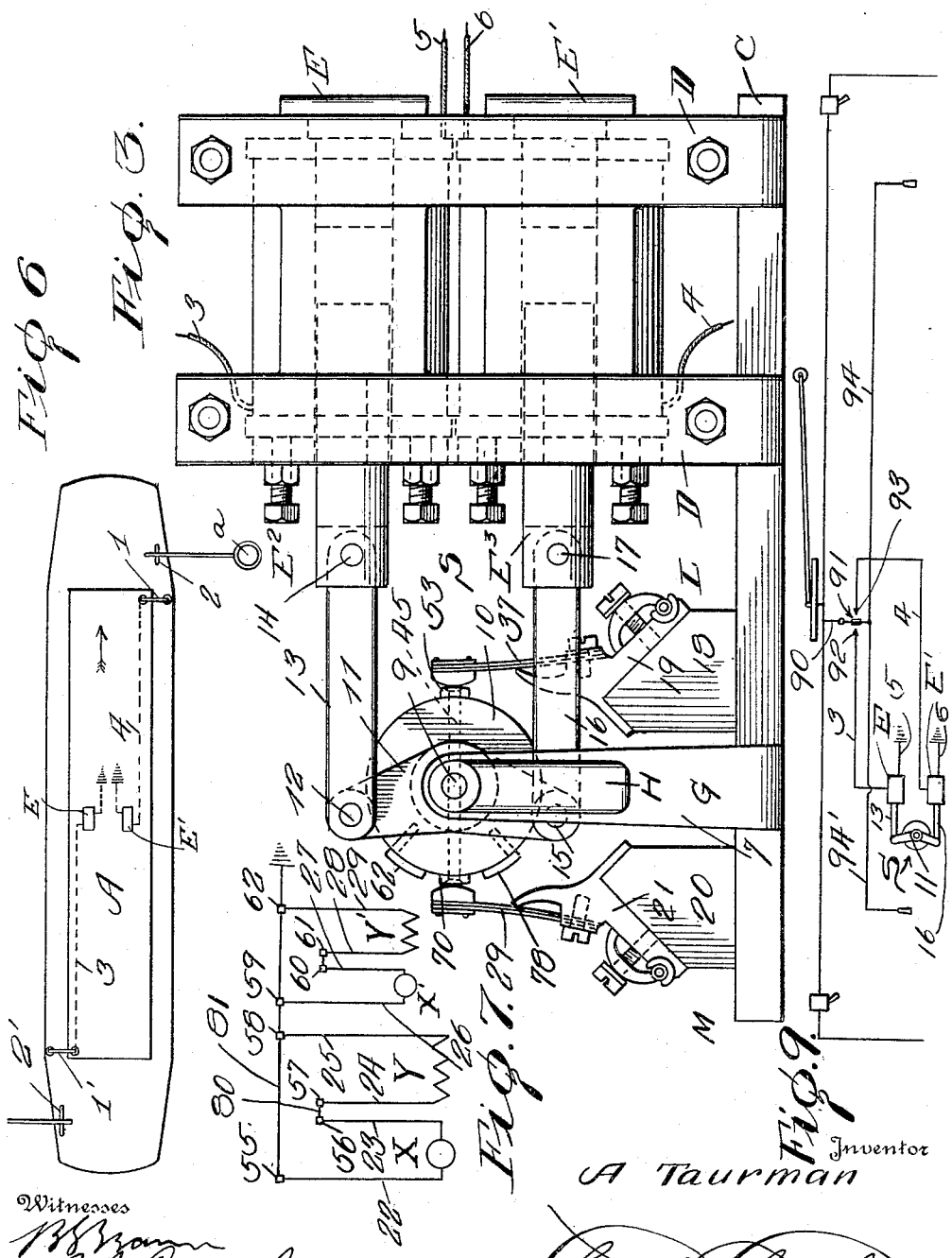

ALPHONSO TAURMAN, OF RICHMOND, VIRGINIA.

AUTOMATIC CAR-STOP.

1,205,814.  Specification of Letters Patent.  Patented Nov. 21, 1916.

Application filed November 18, 1914. Serial No. 872,770.

*To all whom it may concern:*

Be it known that I, ALPHONSO TAURMAN, a citizen of the United States, residing at Richmond, in the county of Henrico, State of Virginia, have invented certain new and useful Improvements in Automatic Car-Stops; and I do hereby declare the following to be a full, clear, and exact description of the invention, such as will enable others skilled in the art to which it appertains to make and use the same.

This invention relates to an apparatus for automatically stopping cars, and has particular application to an apparatus adapted to be employed in connection with cars which are not equipped with air brakes, such as two motor single truck street cars, and light double truck cars, although I wish it to be understood that it may be applied to any electrical railway cars employing continuous current for power purposes.

In my earlier application, filed October 2, 1914, Serial No. 864,624, I have shown an automatic car stopping apparatus adapted for use with cars having air brake equipment. This earlier apparatus embraces among other features a stationary, normally energized contact member located alongside the trackway, and connected in circuit with the trolley or feed wire. Mounted on a car traveling along the track is a second or normally deënergized contact member electrically connected with a solenoid magnet, the plunger of which is connected with an air controlling valve, the latter controlling the supply of air to the circuit breaker, the sanding device and brake cylinder. The construction is such that when the contact on the car strikes against the stationary contact alongside the trackway, as when the car attempts to pass the stationary contact without first coming to a stop, the solenoid magnet will be energized, and the controlling air valve operated to cause the opening of the circuit breaker and the consequent cutting off of the power from the car, the operation of the sanding device and the application of the brakes. As above stated, this invention is intended for use with cars which are not equipped with air brakes, although in the operation of the present invention I employ certain features, such as the stationary contact normally energized by the current from the feed or trolley wire and the traveling contact or the normally deënergized contact or contacts carried by the car. Of course, it is to be further understood that the system of track signals and trackway switches employed in connection with said earlier application may also be used in connection with the present apparatus.

In the present instance I propose to provide an apparatus, which when the normally deënergized contact on a traveling car comes into contact with a stationary, normally energized contact alongside the trackway, will cut off the power from the car and place the electric motors of the car in circuit as short circuited generators, the movement of the car tending to operate the motors as short circuited generators, thus bringing the car to an immediate stop.

In carrying out my invention I place a switch in circuit with the motor leads and the controller or controlling device. This switch in its normal position will not interfere with or hinder the flow of current from the controller or controlling device to the motor in the usual manner. This switch, however, is equipped with certain magnets or solenoids which are energized by current flowing from the feed wire when the energized, stationary contact and the contact on the car are brought into engagement, and when energized the plunger of the solenoid will be operated to actuate the switch proper to cut off the current from the controller and place the motor in circuit as a short circuited generator. For instance, if an electric car is being operated along the trackway and the contact on the front end or the end in the direction in which the car is moving, comes in contact with the stationary contact alongside the track without the said stationary contact being first deënergized, the plunger of the solenoid which is in circuit with the contact on the front of the car or the end in the direction in which it is moving, will be operated to break the electrical connection between the motors and the controllers or controlling devices, thereby open circuiting the motors from the source of power, at the same time placing the armature and fields of each motor in a complete circuit, in such a manner as to convert them into short circuited generators, and the movement of the car will then operate these motors, as short circuited generators. This causes a braking effect for the car, which increases as the speed of the car increases, and decreases as the speed of the car decreases. Thus it will be seen that this braking effect does not tend to slide the wheels, as the brake releases the moment rotary motion of the wheels ceases.

It is also my purpose to provide an apparatus of this character by means of which the car may be quickly and positively brought to a stop, in case an attempt should be made to take the car past the stationary contact without first bringing the car to a stop to enable the conductor or flagman to alight and deënergize the stationary contact by throwing a flagman's switch.

With the above recited objects and others of a similar nature in view, my invention consists in the construction, combination and arrangement of parts set forth in and falling within the scope of the appended claims.

In the accompanying drawings: Figure 1 is a top plan view of a switch embodying my invention, this switch being employed for the two-motor equipment of the car. Fig. 2 is a view in side elevation thereof. Fig. 3 is a view in end elevation. Fig. 4 is a sectional view taken through the rotary member of the switch on the line 4—4 of Fig. 1. Fig. 5 is a diagrammatic view of the switch connections with the motor and controller in normal position. Fig. 6 is a diagrammatic view of a car provided with normally deënergized contacts and also illustrating a stationary contact alongside the trackway, as well as the position of the switch on the car, the connections of such switch with the contacts on the car being conventionally illustrated in dotted lines. Fig. 7 is a diagrammatic view after the motors have been placed in circuit as short circuited generators. Fig. 8 is an end view of the car with its normally deënergized contact, and also showing the location of the stationary or normally positive contact alongside the track. Fig. 9 is a diagrammatic view showing a manually operated three-way switch for operating the electromagnetic switch, and also the connections therefor.

Referring now to the accompanying drawings in detail, and particularly to Figs. 6 and 8, the letter A designates a car traveling in the direction of the arrow and provided with the normally deënergized contacts 1 and 1', while located alongside the trackway is a pole $a$ carrying the stationary contact 2. As in my application above referred to, the stationary contact is in circuit with the feed wire shown at $w$, and is normally energized thereby. It is usually located adjacent the crossing, and in order to deënergize the contact it is necessary for the flagman to leave the car and throw a flagman's switch located alongside the trackway, as shown herein in Fig. 8 at F. In case the car should not be brought to a stop before reaching the stationary contact alongside the track on which the car is traveling, and the car in its travel should bring one of its contacts, for instance the contact 1, into engagement with the adjacent stationary contact 2, the car will be stopped through the mechanism which I will now proceed to describe, and which constitutes the present invention.

In the present instance I have shown two contacts 1—1' on a double end car and two stationary contacts 2—2'. This is to make provision for the car traveling in either direction, for in such case it is necessary to provide separate contacts, one placed on each end of the car and in different circuits with the solenoid magnets, which operate the switch to place the motors in circuit as short circuited generators. Located on the car is a switch designated as an entirety by the letter S, and this switch is shown in detail in Figs. 1, 2 and 3. It comprises a base C, carrying the vertical U-shaped supports D—D. These supports carry the solenoid magnets E and E', mounted one above the other. The plunger of the magnet E is shown at $E^2$, while the plunger of the magnet E' is indicated at $E^3$. A conductor 4 leads from the contact 1 to the magnet E', and likewise a conductor 3 leads from the contact 1' to the magnet E. The conductor 5 leads from the magnet E to the ground, and likewise the conductor 6 leads from the magnet E' to the ground. Also mounted on the base is a vertical U-shaped supporting frame G, the arms 7 of which form bearings for the stud shafts 8 and 9 carrying the cylindrical drum 10, so that the drum 10 will rotate. The stud shaft 9 has mounted thereon a lever 11, to one end of which is connected as at 12, a link arm 13, connected at its opposite end as at 14 to the solenoid plunger $E^2$. Likewise to the opposite end of the lever there is connected, as at 15, one end of the link arm 16, the opposite end of which is connected at 17 to the solenoid plunger $E^3$. The controller side of the switch is indicated at L, and the motor side by the letter M.

The supporting block for the conductor-connecting plates at the controller side of the switch is indicated at 18, the plates being shown at 19, while likewise the supporting block for the conductor-connecting plates at the motor side of the switch is indicated at 20, the plates being designated by the numeral 21. There are eight plates 19 and eight plates 21, and each of these plates in addition to forming a connection for a conductor, is adapted to carry a spring contact conducting arm operating as hereinafter described.

It is well known and forms no part of this invention, that if the motor of a car is placed in circuit as a short circuited generator, and the movement of the car causes it to operate as such, the motor will generate current which will tend to prevent the rotation of the armature of the motor.

Referring now to Fig. 2 which is a side elevation of the switch, I have shown the eight spring contacts on the motor side of this switch, and numbered 22, 23, 24, 25, 26, 27, 28 and 29 leading to the spring contacts 30, 31, 32, 33, 34, 35, 36 and 37 on the opposite side of the drum 10, through conductors 38, 39, 40, 41, 42, 43, 44 and 45, as shown in dotted lines in Fig. 1.

Referring now to Fig. 5, which is a wiring diagram, showing diagrammatically the electrical connections of the switch and the path through which the current flows, when the switch is in its normal or inoperative position, it will be seen that on the controller side of the drum are contact plates 46, 47, 48, 49, 50, 51, 52 and 53; on the motor side are three rows of contact plates, the first one including plates 55, 56, 57, 58, 59, 60, 61 and 62, the second row being numbered 63, 64, 65, 66, 67, 68, 69 and 70, and the third row, 71, 72, 73, 74, 75, 76, 77 and 78.

The operator in manipulating his controller or controlling devices in the usual manner, feeds current to the switch into conductors 30, 46, 38, 63 and 22 into the armature X of No. 1 motor, out of this armature X, through conductors 23, 64, 39, 47 and 31, back to the controller or controlling devices, thence from the controller back through conductors 32, 48, 40, 65 and 24, through the field coils Y of No. 1 motor through conductors 25, 66, 41, 49 and 33, to the ground, if the motors are being operated in parallel, or back to the controller and through the conductors 34, 50, 42, 67 and 26, to the armature X' of motor No. 2, thence through conductors 27, 68, 43, 51 and 35, to the controlling devices, thence from the controlling devices back through conductors 36, 52, 44, 69 and 28, through fields Y' into conductors 29, 70, 45, 53 and 37, to the ground completing the circuits through this switch for No. 2 motor, if the motors are being operated in series. This is the arrangement of the conductors when the car is traveling along the track with the power on, but I wish it to be understood that this switch is just as effective to stop the car when the usual current controller is off and the power circuit to the motor is opened, (and the car is coasting) as when the power is on as described above.

As before stated, the stationary contact 2 is located at or alongside the trackway, usually at a railway crossing or other point of danger. Now. for example, should the car traveling in the direction of the arrow reach the stationary contact 2 without coming to a stop so that the conductor or flagman may alight and deënergize this stationary contact 2 by throwing the flagman's switch F, the contact 1 on the car striking the stationary contact 2, will cause the current from the feed wire to pass through the conductor 4 to the magnet coil E', drawing the plunger $E^3$ inward, or to the right as shown in Fig. 3, pulling with it the link arm 16 and rocking the lever 11 to turn the drum 10, so that the spring contact conductors 30, 31, 32, 33, 34, 35, 36 and 37 are disengaged from the contact plates 46, 47, 48, 49, 50, 51, 52 and 53. At the same time the spring contacts 22, 23, 24, 25, 26, 27, 28 and 29 have been disengaged from the contact plates 63, 64, 65, 66, 67, 68, 69, and 70, and engage with the contact plates 55, 56, 57, 58, 59, 60, 61 and 62, and complete the circuit from contact plate 55 through conductor 22, armature X of No. 1 motor, conductor 23, contact plate 56, conductor 80, contact plate 57, conductor 24, field coil Y of No. 1 motor, conductor 25, contact 58, conductor 81. No. 1 armature and field coil are in a complete circuit through the conductors described above and thus short circuited as shown diagrammatically in Fig. 7. At the same time it will be seen that I have provided contact plates and conductors to place No. 2 motor in circuit as a short circuited generator, as shown in Fig. 7, and any movement of the car will tend to operate both motors as generators short circuited and thus bring the car to a stop. Should the car be traveling in the opposite direction from that indicated by the arrow and contact 1' on the car engage an adjacent stationary contact 2' along the trackway, the current will flow through the contacts, through conductor 3, solenoid magnet E, cause the plunger $E^2$ to be drawn inward, rocking the lever 11 and rotating the drum 10, causing the contact spring conductors 30, 31, 32, 33, 34, 35, 36 and 37 to disengage from contact plates 46, 47, 48, 49, 50, 51, 52 and 53, at the same time disengaging spring contact conductors 22, 23, 24, 25, 26, 27, 28 and 29 from the contact plates 63, 64, 65, 66, 67, 68, 69 and 70 and engaging contact plates 71, 72, 73, 74, 75, 76, 77 and 78 and completing a circuit from conductor 84, contact 72, conductor 23, armature X of motor No. 1, conductor 22, contact plate 71, conductor 83, contact plate 73, conductor 24, field coils Y of No. 1 motor and conductor 25, contact plate 74, back to conductor 84 and completes the circuit, thereby converting the motor into a short circuited generator, as before described, and bringing the car to a stop.

Circumstances may arise where it is desirable to enable the motorman or conductor to stop the car in an emergency by operating the before mentioned electro-magnet switch, without resorting to the usual means and method of bringing the car to a stop by cutting off the controller and putting on the brake. To accomplish this I provide the arrangement shown in Fig. 9, wherein a conductor 90 leads to a three-way manually operable switch 91 from the main trolley wire or main circuit of the car. The poles of this switch, shown at 92 and 93 are connected to conductors 3 and 4, which lead to the switch S in the manner heretofore described. Leading from this switch 91, as shown at 94 and 94', are cords or other manually operated means for closing conductor 90 into either pole 92 or 93 of switch 91 and leading to the front and rear of the car or any other convenient location, whereby the motorman or conductor may close a circuit from the main trolley wire through conductor 90, the switch 91 and either of the poles 92 and 93, to the conductors 3 or 4, to the respective solenoids of the latter, and causing the operation of the car stopping appliance as described above, and according to the direction in which the car is traveling.

After the car has been brought to a stop through the agency of my invention, it is necessary to manually operate the handle H to restore it to its vertical position as shown in Fig. 3 in order to rotate the drum back to its normal position to allow the flow of the current to and from the motors at the will of the operator of the car.

While I have herein shown and described one particular embodiment of my invention, I wish it to be understood that I do not confine myself to all the precise details of construction herein set forth by way of illustration, as modification and variation may be made without departing from the spirit of the invention or exceeding the scope of the appended claims.

What I claim is:—

1. The combination with a main feeder, a contact electrically connected therewith and normally energized thereby, a car having suitable controlling devices and a motor in circuit with the feeder, a normally deenergized circuit, a contact carried by the car and a magnet both located in said deenergized circuit, a switch interposed between the controlling devices and the motor and adapted when the contact on the car engages with the first mentioned contact to break the circuit between the motor and the controlling devices converting said motor into a short circuited generator to stop the car, a switch remote from the car between the main feeder and the contact electrically connected therewith to prevent energization of the secondary circuit and actuation of the switch to place the motor in circuit as a short circuited generator.

2. The combination with a source of power, an electric motor in circuit therewith, an electromagnetic switch having a plurality of magnets and a plurality of contacts, each magnet being in a normally deenergized circuit whereby the energizing of one circuit operates the switch to place the motor in circuit as a short circuited generator when the car is moving in one direction and the energizing of another circuit operates the switch to place the motor in circuit as a short circuited generator when the car is moving in the opposite direction, and means for energizing the said circuit.

3. The combination with a source of power, of a car having an electric motor normally in circuit with a source of power, an electric switch in circuit with the source of power and the motor, a plurality of magnets controlling said switch, and means for energizing said magnets to operate the switch to place the motors of the said car in circuit as a short circuited generator in either direction in which the car may be moving, when the proper magnet is energized.

4. The combination with a main feeder, a stationary contact electrically connected therewith and normally energized thereby, and a traveling car, of a contact carried by the car, a motor for the car normally in circuit with the feeder, controller devices for the motor, an electromagnet carried by the car and electrically connected with the contact on the car, a plunger for the magnet, a drum connected with said plunger, contacts carried by the drum and normally in position to complete the circuit from the main feeder through the controlling devices to the motor, said magnet being energized when the contact on the car engages with the stationary contact to actuate the plunger to rotate said drum to break the circuit between the main feeder and the motor and convert such motor into a short circuited generator to stop the car independently of the controlling devices, a switch remote from the car between the main feeder and the stationary contact to prevent energization of the contact on the car to rotate the drum to place the motor in circuit as a short circuited generator.

5. The combination with a main feeder, a stationary contact electrically connected therewith and normally energized thereby, and a traveling car, of a contact carried by the car, a motor for the car normally in circuit with the feeder, and means interposed between the motor and the feeder and electrically connected with the contact on the car, said means being operable when the contact on the car engages with the stationary energized contact to break the circuit between the motor and the feeder and convert such motor into a short circuited generator to stop the car, and a distant switch in circuit with the main feeder and adapted to be actuated to deënergize the stationary contact and prevent the operation of said means.

6. The combination with a main feeder, a stationary contact electrically connected therewith and normally energized thereby, a traveling car, of a contact carried by the car, a motor for the car normally in circuit with the feeder, means interposed between the motor and the feeder and electrically connected with the contact on the car, said means being operable when the contact on the car engages with the stationary energized contact to break the circuit between the motor and the feeder and convert such motor into a short circuited generator to stop the car, a distant switch in circuit with the main feeder and adapted to be actuated to deënergize the stationary contact and prevent the operation of said means, and a pair of signal lamps in circuit with the distant switch and adapted to be alternately lighted and extinguished with the opening and closing of the switch.

In testimony whereof I affix my signature in the presence of two witnesses.

ALPHONSO TAURMAN.

Witnesses:
RICHARD B. CAVANAGH,
MABEL E. HARTLEY.

Copies of this patent may be obtained for five cents each, by addressing the "Commissioner of Patents, Washington, D C."